United States Patent [19]
Dacar

[11] Patent Number: 4,605,139
[45] Date of Patent: Aug. 12, 1986

[54] SELF-TARGETING ELECTRICAL OUTLET BOX

[76] Inventor: Arlen M. Dacar, 41211 Mount Hope Rd., Flushing, Ohio 43977

[21] Appl. No.: 546,395

[22] Filed: Oct. 28, 1983

[51] Int. Cl.$^4$ ............................................. H02G 3/12
[52] U.S. Cl. .............................. 220/3.4; 33/DIG. 10; 174/57
[58] Field of Search .......................... 174/53, 57, 58; 220/3.2, 3.3, 3.4, 3.5, 3.6, 3.7, 3.92, 3.94; 33/197, DIG. 10

[56] References Cited

U.S. PATENT DOCUMENTS

| | | | |
|---|---|---|---|
| 2,775,812 | 1/1957 | Mohr | 220/3.4 X |
| 2,788,151 | 4/1957 | Shore | 220/3.4 |
| 3,878,315 | 4/1975 | Blush | 174/57 |
| 3,940,857 | 3/1976 | Giordano | 33/DIG. 10 X |
| 4,023,697 | 5/1977 | Marrero | 220/3.4 |
| 4,209,103 | 6/1980 | Glovier | 220/3.4 |

Primary Examiner—Laramie E. Askin
Attorney, Agent, or Firm—Vorys, Sater, Seymour & Pease

[57] ABSTRACT

An electrical outlet box is constructed in two sections adapted to be assembled together with one box section including an endwall and sidewalls extending from the endwall and terminating in free edges defining an open front with a plurality of elongated spike members rigidly mounted on the sidewalls and projecting outwardly from the open front in parallel spaced relation to one another, and the other box part is made up of a plurality of sidewall sections with an open front and back corresponding in size and shape to the open front of the first box section, and having guides adapted to engage the spike members to align the sidewalls of the two sections, with the guides and spike members cooperating to guide the two box sections into aligned relation whereby the sidewalls of the two box sections cooperate to define the sidewalls of the complete assembly. The spike members on the first box section are capable of piercing wallboard and act as guides to align the second box section to serve as a template to mark the wallboard for cutting an opening therein and as fastening means to fasten the second box section to the first box section.

15 Claims, 3 Drawing Figures

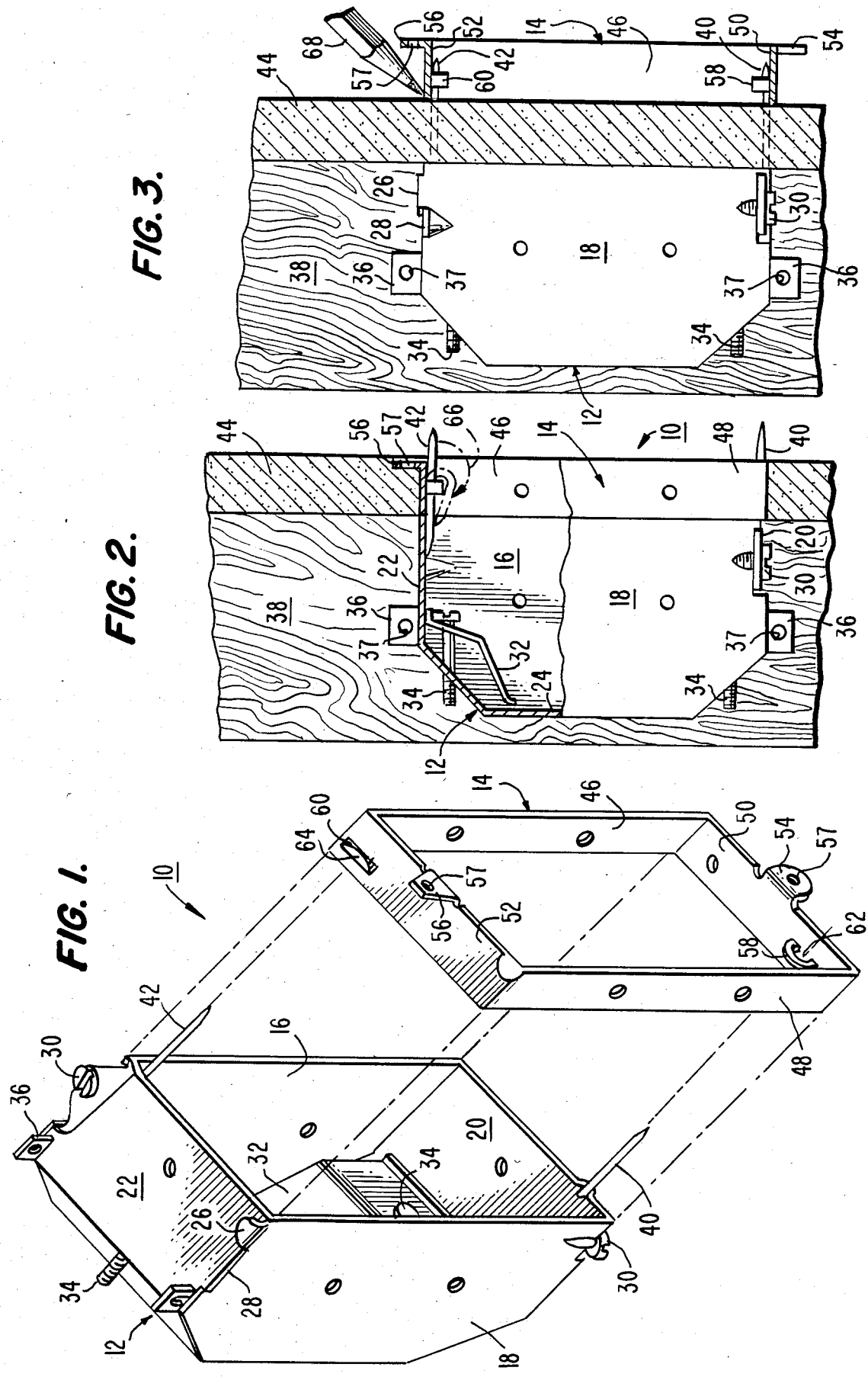

SELF-TARGETING ELECTRICAL OUTLET BOX

BACKGROUND OF THE INVENTION

1. Field of the Invention

This invention relates to electrical outlet boxes, and more particularly to an improved two-part shelf-targeting electrical outlet box assembly including means facilitating the location of access holes in overlying wallboard, with the outlet box extending substantially through the access opening after the wallboard is installed.

2. Description of the Prior Art

Internal walls of buildings are frequently constructed of preformed sheets of wallboard, commonly called drywall, secured to an open framework including studs, beams, joists, bracing and the like. When such wall frame-work is of wood, it is also common practice to locate the building electrical system in the wall with the conductors passing over or through the frame members and with the outlets, switches, fixtures and the like being connected to the conductors in rigid outlet boxes firmly secured to the frame members as by nailing. These outlet boxes are installed prior to installation of the drywall and it is necessary for the drywall installation crew to mark the outline of the outlet box at the proper location on the drywall surface and then to cut an access opening corresponding to the size and shape of the outlet box before the drywall is permanently nailed to the underlying framework.

As explained in the U.S. Pat. Nos. 2,775,812, 2,788,151 and 4,209,103, various methods and techniques have been used to locate and cut the outlet box access openings in the drywall. These patents each propose some form of movable or removable elongated spike or blade supported on the outlet box in position to penetrate the drywall and locate a template or other device to accurately mark the outline of the opening to be formed. These devices, however, have generally not met with commercial success for various reasons. For example, the movable or removable spikes or blades could become displaced in positioning the drywall so that no penetration would be achieved or, in the case of the locating devices of U.S. Pat. No. 2,775,812, additional time could be required to mount and dismount the locating device so that the anticipated time saving would not be achieved.

The prior art outlet boxes, including those incorporating self-targeting features as described above, have an open side and are adapted to be mounted with this open side substantially flush with the inner surface of the drywall. Thus, the outlet box is recessed from the face or outer surface of the drywall by a distance at least equal to the thickness of the drywall, usually ½ or ⅝ inch. If the opening formed in the drywall does not precisely register with the open face of the outlet box, there will be communication from the outlet box directly into the interior of the wall so that at least a portion of the safety features to be obtained by the relatively heavy substantially fire-resistant outlet box could be lost. Further, when a wall switch or outlet receptacle is mounted in these prior art outlet boxes, the drywall acts as a spacer so that the switch or receptacle is not fully recessed within the outlet box as desired. Since such drywall is frequently formed from an easily damaged filler material such as gypsum sandwiched between two paper sheets, the rigid support desirable for switches and outlet receptacles is frequently lost. It is, therefore, the primary object of the present invention to provide an improved self-targeting outlet box which will avoid the deficiencies of the prior art as outlined above.

Another object is to provide such an improved outlet box structure formed in two parts adapted to be secured together to form the complete outlet box assembly.

Another object is to provide such a two-part outlet box construction including a first part having the general configuration of a conventional outlet box and adapted to be mounted on a framing member with its open face substantially flush with the internal surface of subsequently mounted wallboard, and a second part adapted to be mounted within an access opening formed in the wallboard and secured to the first part to form the completed box assembly.

Another object is to form such a two-part outlet box construction wherein the second outlet box part terminates in an open edge portion adapted to be positioned substantially adjacent the outer surface of the wallboard and including mounting tabs for firmly supporting switches, outlet receptacles, and the like mounted thereon.

Another object is to provide such a two-part outlet box construction wherein the first box part includes spike means adapted to penetrate a sheet of drywall and act as a guide to position the second part to act as a template for marking the access opening to be cut in the drywall whereby the second outlet box part may be positioned within the formed opening and permanently secured to the first outlet box portion.

Another object is to provide such an outlet box construction wherein said spike means may be employed as fastener means for securing the first and second outlet box parts together.

SUMMARY OF THE INVENTION

The foregoing and other objects and advantages are achieved in accordance with the present invention wherein an outlet box is constructed in two parts adapted to be assembled together to form the complete outlet box. Each part may, of course, be formed from a plurality of elements assembled together as by interlocking tabs and screw fasteners, or the components may be permanently joined as by welding, if desired. The first outlet box part may be of a size and configuration generally conforming to the size and configuration of a conventional or standard electrical outlet box and have a bottom wall and rigid sidewalls terminating in an open face which, when mounted on a framing member, is normally disposed adjacent the inner surface of the drywall panel. The first part includes means for securing the assembly to a framing member, and the conventional knock-out tabs and conduit clamping members are provided for receiving and retaining electrical conductors to be connected within the outlet box.

A pair of elongated pointed spike members are rigidly mounted on the first outlet box part and project outwardly in spaced parallel relation to one another from the edge of its open face. The spikes each have a length slightly greater than the thickness of the wallboard to be used in constructing the internal wall whereby, when the first box part is rigidly mounted, as by nailing, to a framing member with its open face substantially flush with the outwardly directed face of the framing member, the spikes will engage and penetrate completely through a sheet of wallboard placed against the frame.

The second outlet box part is, in effect, a ring-like extension of the sidewalls of the first part and is adapted to be secured to the first part and cooperate therewith to define the complete outlet box. The second part is made up of a plurality of flat plate members arranged in an open frame structure and having their adjacent ends rigidly joined together so that when the two outlet box parts are secured together, the wall members of the first and second parts are supported in edge-to-edge relation. The second part has a pair of guide members arranged to telescopingly receive the outwardly projecting spike members to align the two parts, enabling the second part to be employed as a template to mark the wallboard to accurately locate the opening to be cut therein. After the wallboard opening is cut, the second outlet box part can again be positioned on the spikes and moved into the cut opening to engage the first part. The spikes may then be bent to a position where they do not project outwardly from the wallboard and the deformed spikes may be relied upon to rigidly assemble the two outlet box parts together. When assembled, the complete outlet box extends from a position adjacent the outer surface of the wallboard into the inner core of the framed wall to form a substantially complete enclosure for switches, outlet receptacles, and the like and for the electrical connections of such elements. This arrangement also enables the mounting tabs for such switches, receptacles, and the like to be positioned substantially adjacent the outer surface of the wallboard to provide a more accurate and sturdy positioning of these elements.

BRIEF DESCRIPTION OF THE DRAWINGS

Other features and advantages of the invention will be apparent from the detailed description contained hereinbelow, taken in conjunction with the drawings, in which:

FIG. 1 is an exploded isometric view of the outlet box assembly according to the present invention;

FIG. 2 is an elevation view, partially in section, of the outlet box assembly installed in an internal wall of a building; and FIG. 3 is a view similar to FIG. 2 and showing use of the outlet box assembly as a template to mark the opening to be cut in a sheet of drywall.

DESCRIPTION OF THE PREFERRED EMBODIMENTS

Referring now to the drawings in detail, the outlet box assembly according to the present invention is designated generally by the reference numeral 10 and comprises a primary or first box part or section 12 and a second box part or section 14. The first part 12 may take various configurations such as are conventionally employed in installation of ceiling fixtures, wall switches, outlet receptacles, and the like and is illustrated in the drawings in the general configuration of a conventional switch box including a pair of parallel, separately formed side panels 16, 18 with opposed endwalls 20, 22 and bottom wall 24 integrally formed from a single piece of thin metal plate. Conventional interlocking tabs 26, 28 and screw fasteners 30 are employed to mount the side panel 16, 18 on the plate member defining the end and bottom walls. Also, as seen in FIG. 2, conventional conductor clamping plates 32 and retainer screws 34 are provided in the first box section 12. Mounting tabs 36 having nail openings 37 formed therein are integrally formed on the respective endwalls 20, 22 to provide for mounting the box assembly to a wooden frame member such as the vertical stud 38 shown in FIGS. 2 and 3. Preferably the conventional laterally extending, threaded switch mounting tabs are not provided on the free edges of the endwalls, however, as these elements are provided on the second part of the assembly as described hereinbelow.

A pair of self-targeting locator pins or spikes 40, 42, respectively, are rigidly mounted as by welding on the endwalls 20, 22, respectively, with the spikes projecting outwardly from the open face of the first box section 12. Spikes 40 and 42 are preferably located adjacent diametrically opposed corner portions of the first box section and extend outwardly from the free edge of the respective endwalls a distance which is slightly greater than the thickness of the wallboard sheets, indicated at 44 in FIGS. 2 and 3, which are to be mounted on the wooden framework. Spikes 40 and 42 are preferably relatively thin, nail-like elements having a relatively sharp point to enable them to easily penetrate the wallboard sheet. Also, the spikes are formed from a material having sufficient hardness to resist bending by the application of force to a drywall sheet to cause the spikes to penetrate completely through the sheet; however, as pointed out hereinbelow, the spikes preferably are relatively easily bent by a suitable tool such as a pair of pliers or a screwdriver whereby the outwardly projecting ends of the spikes can be pushed back into the box assembly once it is completely installed.

The second box part 14 comprises a plurality of substantially flat thin metal plate members secured together into a configuration corresponding to the configuration of the open face of the first box section 12. Thus, in the generally rectangular box configuration illustrated in the drawings, the second box section comprises a pair of opposed side plates, 46, 48 and a pair of opposed end plates 50, 52 rigidly joined by welding. A pair of laterally extending switch or outlet receptacle mounting tabs 54, 56, respectively, having standard threaded openings 57 therein, are integrally formed on the outwardly directed edge of endwalls 50, 52, respectively. Also, each end wall 50, 52, respectively, has formed therein a guide member comprising an inwardly directed strap section 58, 60, respectively, formed as by a stamping operation which deflects a portion of the metal from the respective wall members inwardly to form a pair of aligning openings 62, 64 in position to receive the spike members 40, 42, respectively.

In use of the improved self-targeting outlet box assembly just described, first outlet box section 12 is secured to a frame member such as the stud 38 by two long screws or nails inserted through the openings in mounting tabs 36 on each end portion of the box and driven into the frame member. The open face of the first box part is located substantially flush with the edge surface of the frame member. In this position the spikes 40, 42 project outwardly from the plane of the frame so that when a sheet of wallboard such as drywall sheet 44 is placed against the frame and pressed into engagement with the outwardly directed surface of the frame members, the spikes will penetrate completely through the wallboard and project outwardly from its outer surface as shown in FIGS. 2 and 3. As shown in FIG. 3, box part 14 is then positioned on the spikes, with the spike 40 projecting through the opening 62 defined by the strap 58 and endwall 50 and spike 42 projecting through the opening 64 defined by the strap 60 and endwall 52. This accurately aligns the corresponding panels of the two box parts.

By holding part 14 against the surface of the drywall panel, the workman can use this as a template to accurately mark the opening to be cut in the drywall using a pencil 68 or other suitable marking means as shown in FIG. 3. The drywall sheet, which has only been temporarily held in position, is then removed and the opening cut before the panel is replaced and firmly nailed into its final position with the access opening in the drywall accurately registering with the previously installed outlet box section 12. Thereafter, part 14 is installed on the spikes to bring its inner edges into direct contact with the outwardly directed edges of part 12 to form the box assembly extending through the drywall from a position adjacent the outer or room surface of the drywall panel. The projecting end portions of the respective spikes 40, 42, can then be deflected inwardly as shown in broken lines at 66 in FIG. 2 to firmly and permanently attach parts 12 and 14 to form the complete box assembly. The mounting tabs 54, 56 are thus located at a position adjacent the outer surface of the drywall panel 44 so that a switch, receptacle, or the like can be mounted directly onto the mounting tabs without relying upon the fragile structure of the drywall panel as support for the electrical element.

While a preferred embodiment of the invention has been disclosed and described, it is believed apparent that various modifications may be made thereto without departing from the invention. Accordingly, it is intended to cover all embodiments of the invention which would be apparent to one skilled in the art and which come within the spirit and scope of the invention.

What is claimed is:

1. An electrical outlet box comprising, in combination
   first and second box sections adapted to assembled together
   said first box section including a backwall, sidewalls extending from said backwall, and an open front, said sidewalls terminating in free edges disposed in a common plane defining said open front,
   a plurality of elongated spike members rigidly mounted on said sidewalls and projecting outwardly from said open front in parallel spaced relation to one another and perpendicular to the plane of said open front,
   said second box section having sidewalls and an open front and open back, said open front and back corresponding in size and shape to the open front of said first box section,
   guide members on said second box section adapted to engage said spike members and align said sidewalls of said first and second box sections, said guide members and said spike members cooperating to guide said second box section into engagement with said first box section in aligned abutting relation when said first and second box sections are assembled together, whereby the sidewalls of said said second box section form extensions of the sidewalls of said first box section, 2. The outlet box defined in claim 1 further comprising a pair of mounting tabs formed on and projecting laterally from the sidewalls of said second box section adjacent said open front thereof, said mounting tabs having threaded openings therein in position for mounting standard electrical wiring components.

3. The outlet box defined in claim 1 further comprising mounting means on said first box section adapted to receive fasteners for mounting said first box section on a building frame member.

4. The outlet box defined in claim 3 wherein said spike members each project outwardly from said open front of said first box section a distance at least slightly greater than the thickness of standard building wallboard panel, whereby when said first box section is mounted on a building frame member with said free edges substantially flush with an outwardly directed surface of the frame member, said spikes will penetrate completely through such standard building wallboard panel overlying said first box section and in contact with said outwardly directed frame member surface.

5. The outlet box defined in claim 4 wherein said guide members on said second box section are adapted to engage the end portions of said spike members projecting through a standard wallboard panel to align the sidewalls of said second box section with the sidewalls of said first box section, whereby said second box section may serve as a template to accurately locate an access opening to be cut in the wallboard panel.

6. The outlet box defined in claim 5 wherein said second box section is adapted to be located within an access opening cut in a standard wallboard panel mounted on a building frame when said first and second box sections are assembled together to thereby form a substantially continuous electrical outlet box extending substantially through the wallboard panel and into the building wall.

7. The outlet box according to claim 6 wherein said guide members on said second box section and said spike members constitute means for securing said first and second box sections in said aligned abutting relation, said spike members being adapted to be deflected after said first and second box sections are positioned in said aligned abutting relation to retain said box sections assembled.

8. The outlet box according to claim 6 wherein said guide members comprise means on at least two sidewalls of said second box section defining openings for telescopingly receiving said spike members, whereby when said first and second box sections are assembled together, said spike members can be bent to rigidly retain said box sections in assembled relation.

9. The outlet box defined in claim 8 further comprising a pair of mounting tabs formed on and projecting laterally from the sidewalls of said second box section adjacent said open front thereof, said mounting tabs having threaded openings therein in position for mounting standard electrical wiring components.

10. The outlet box defined in claim 1 wherein said guide members on said second box section are adapted to engage the end portions of said spike members projecting through a standard wallboard panel to align the sidewalls of said second box section with the sidewalls of said first box section, whereby said second box section may serve as a template to accurately locate an access opening to be cut in the wallboard panel.

11. The outlet box defined in claim 1 wherein said second box section is adapted to be located within an access opening cut in a standard wallboard panel mounted on a building frame when said first and second box sections are assembled together to thereby form a substantially continuous electrical outlet box extending substantially through the wallboard panel and into the building wall.

12. The outlet box according to claim 1 wherein said guide members on said second box section and said spike members constitute means for securing said first and second box sections in said aligned abutting relation, said spike members being adapted to be deflected after said first and second box sections are positioned in said aligned abutting relation to retain said box sections assembled.

13. The outlet box according to claim 12 wherein said guide members comprise means on at least two sidewalls of said second box section defining openings for telescopingly receiving said spike members, whereby when said first and second box sections are assembled together, said spike members can be bent to rigidly retain said box sections in assembled relation.

14. The outlet box defined in claim 13 further comprising a pair of mounting tabs formed on and projecting laterally from the sidewalls of said second box section adjacent said open front thereof, said mounting tabs having threaded openings therein in position for mounting standard electrical wiring components.

15. The electrical outlet box of claim 1 which additionally comprises means for securing said first and second box sections in said aligned abutting relation.

* * * * *